(No Model.)  4 Sheets—Sheet 1.

J. P. & O. G. BURNHAM.
DISINTEGRATING AND SEPARATING APPARATUS.

No. 448,844. Patented Mar. 24, 1891.

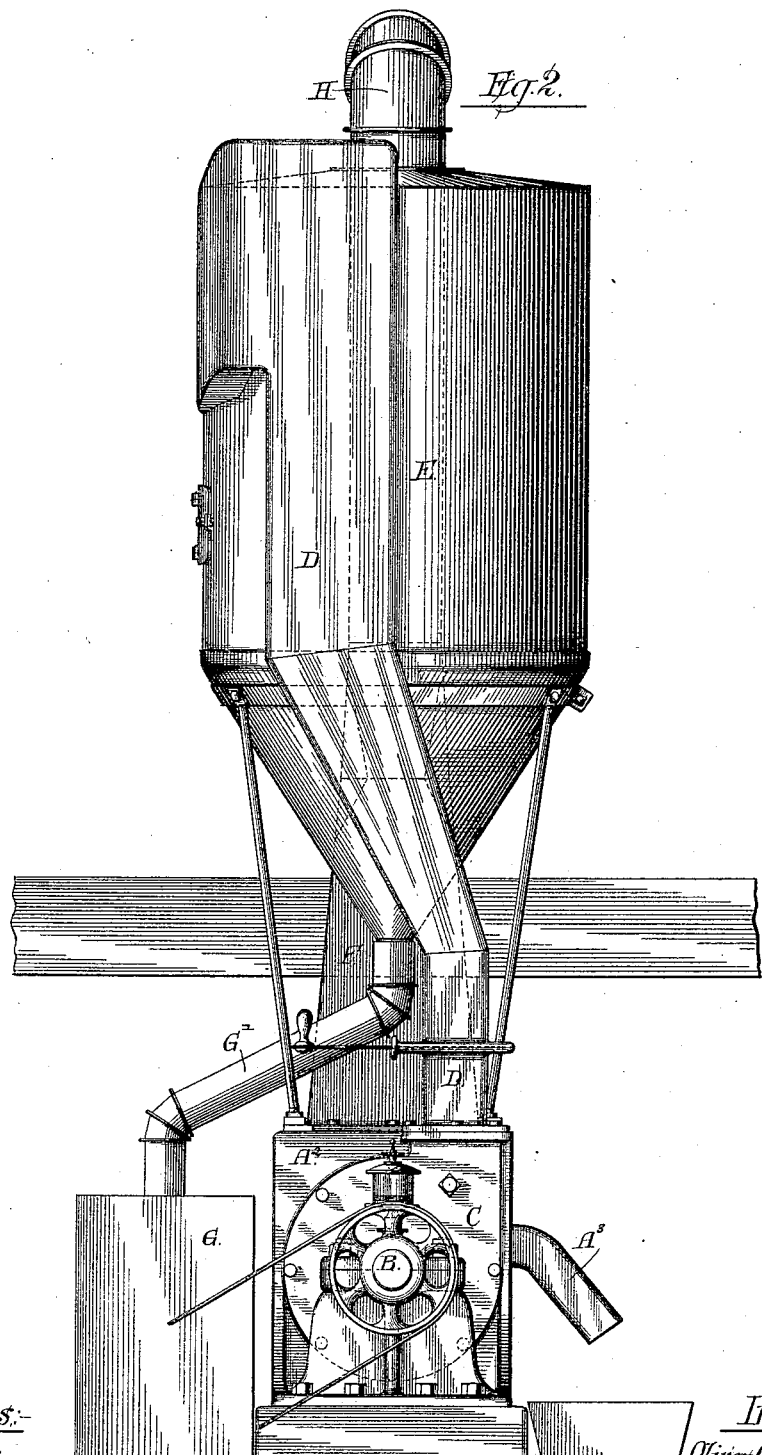

(No Model.) 4 Sheets—Sheet 3.
J. P. & O. G. BURNHAM.
DISINTEGRATING AND SEPARATING APPARATUS.
No. 448,844. Patented Mar. 24, 1891.
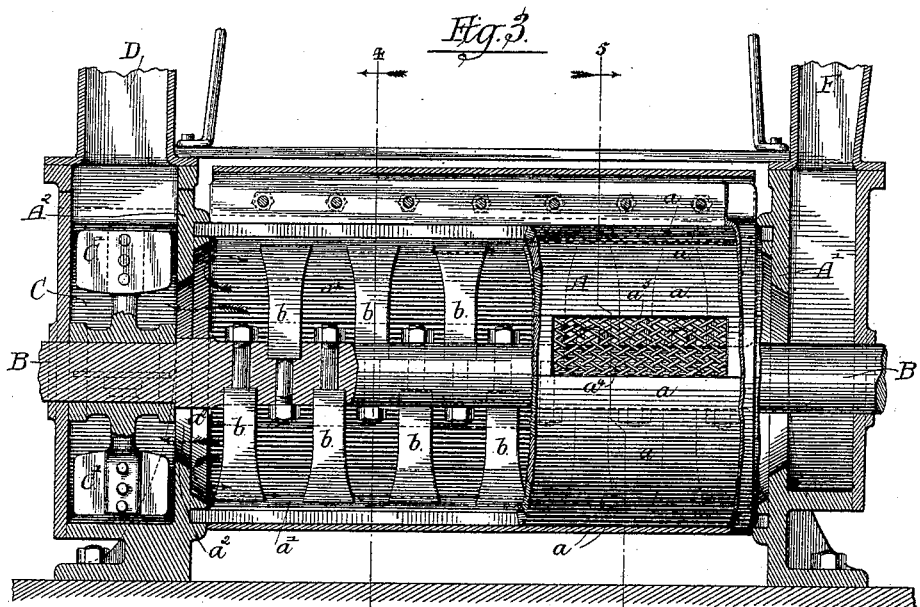
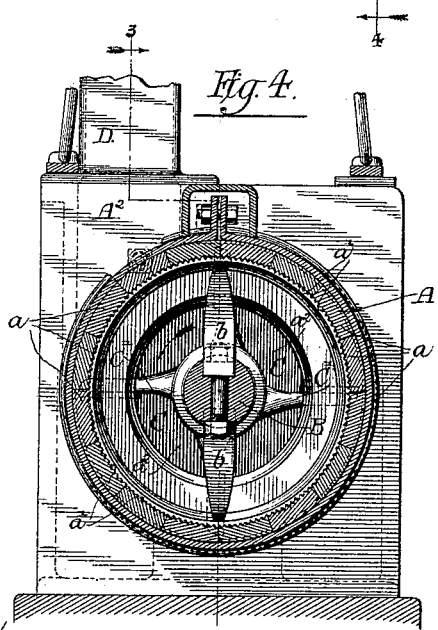
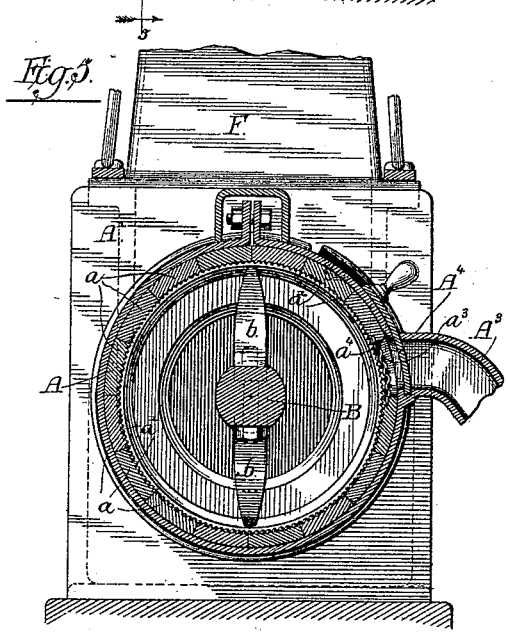
Witnesses:
Louis M. F. Whitehead.
Wm. F. Henning.
Inventors:
Oliver G. Burnham
John P. Burnham
by Dayton, Poole & Brown
Attorneys.

(No Model.) 4 Sheets—Sheet 4.
J. P. & O. G. BURNHAM.
DISINTEGRATING AND SEPARATING APPARATUS.
No. 448,844. Patented Mar. 24, 1891.

Witnesses:
Louis M. F. Whitehead.
Wm. T. Henning.

Inventors:
Oliver G. Burnham
John P. Burnham
by Dayton, Poole & Brown
Attorneys.

UNITED STATES PATENT OFFICE.

JOHN P. BURNHAM AND OLIVER G. BURNHAM, OF CHICAGO, ILLINOIS.

DISINTEGRATING AND SEPARATING APPARATUS.

SPECIFICATION forming part of Letters Patent No. 448,844, dated March 24, 1891.

Application filed March 18, 1890. Serial No. 344,367. (No model.)

*To all whom it may concern:*

Be it known that we, JOHN P. BURNHAM and OLIVER G. BURNHAM, of Chicago, in the county of Cook and State of Illinois, have invented certain new and useful Improvements in Disintegrating and Separating Apparatus; and we do hereby declare that the following is a full, clear, and exact description thereof, reference being had to the accompanying drawings, and to the letters of reference marked thereon, which form a part of this specification.

This invention relates to apparatus of the centrifugal type for disintegrating or agitating and separating various substances, and also to the combination of a pneumatic collector with such disintegrator or agitator.

Figure 1:
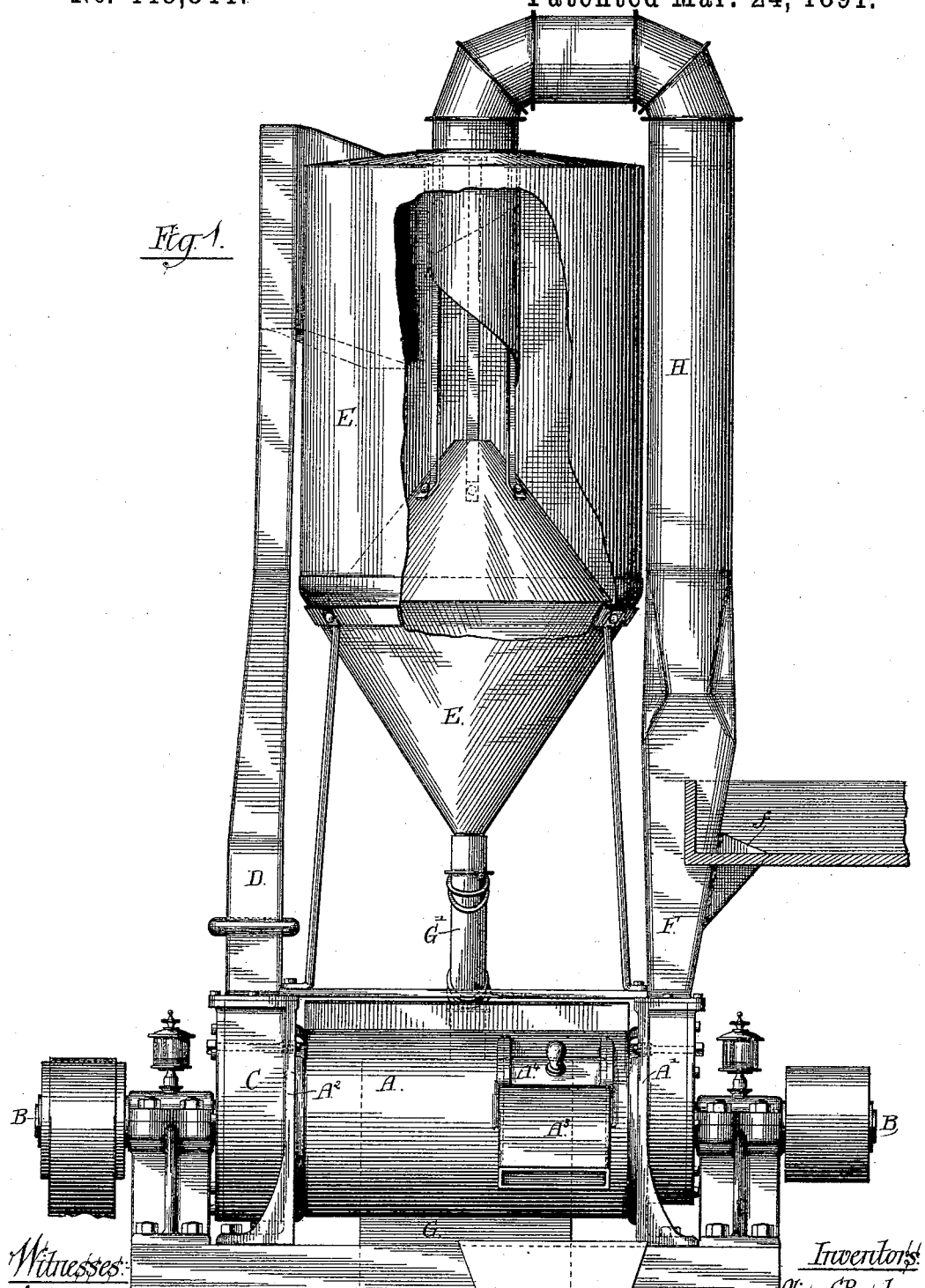
Figure 6:
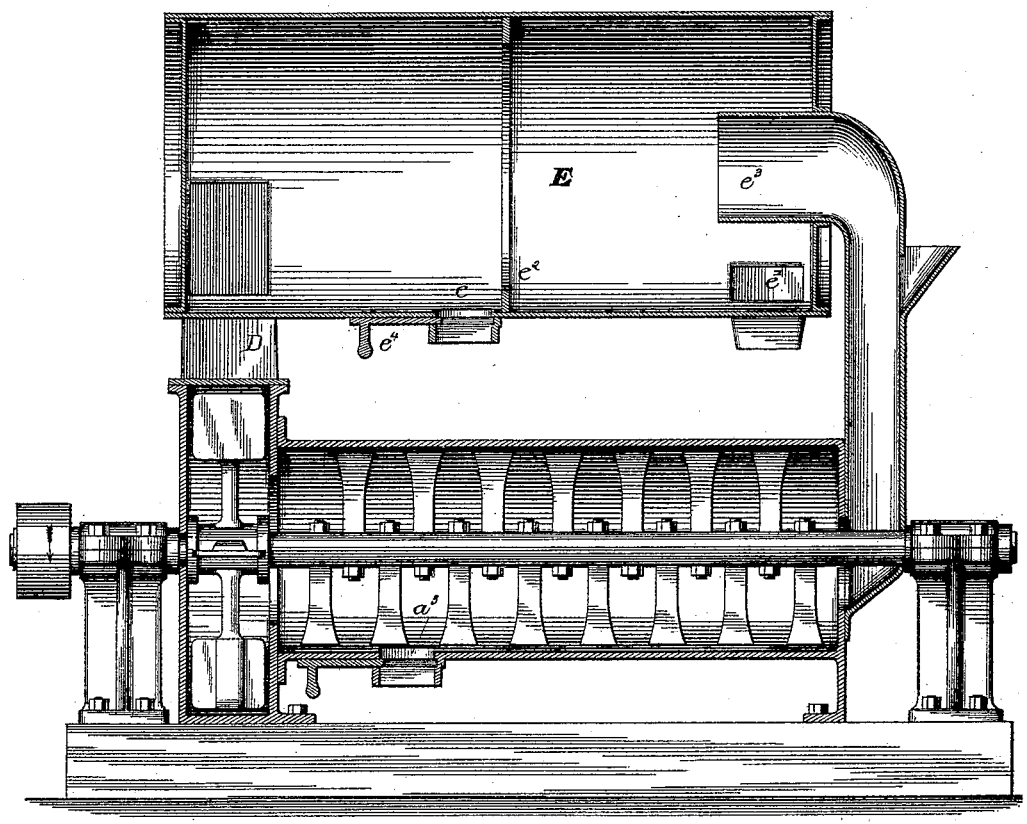

In the accompanying drawings, Figure 1 is a side elevation of a disintegrator constructed in accordance with our invention and combined with a pneumatic collector of the cyclone type. Fig. 2 is an elevation of the mechanism shown in Fig. 1, presenting an end view of the disintegrator. Fig. 3 is a central vertical longitudinal section of the disintegrator and the fan connected with the central discharge-opening of the latter, a portion of the disintegrator-cylinder being shown in side elevation and provided with a peripheral discharge-opening. Fig. 4 is a transverse section in the line 4 4 of Fig. 3. Fig. 5 is a transverse section in the line 5 5 of Fig. 3, showing a spout added to the peripheral opening shown in said Fig. 3. Fig. 6 is a central vertical section of a disintegrator and a pneumatic collector connected therewith, the latter being of a construction adapted to separate the substances taken from the disintegrator into two or more bodies of varying specific gravity and to discharge said bodies separately.

First describing particularly the machine illustrated in Figs. 1 to 5, inclusive, of the drawings as one embodiment of my invention, A represents a hollow cylinder, the peripheral wall of which is made up of a series of lengthwise bars or staves $a$ of iron, provided on their inner surfaces with longitudinal ribs $a'$, said ribs being shown as sharp at their edges, as seen in transverse sectional Figs. 4 and 5.

At one end the cylinder A is provided with a head A', having an opening at any suitable point therein, through which the material to be disintegrated, pulverized, or agitated may be introduced. At the opposite end the cylinder A is provided with an annular head $A^2$, extending from the periphery of the cylinder inward and leaving a central opening $a^2$ of less diameter than that of the interior of the cylinder A. In the axis of the cylinder A is mounted a shaft B, and said shaft is provided with a number of radial arms or beaters $b$ $b$, extending at their ends to the neighborhood of the inner surface of the cylinder.

C is a fan case or chamber communicating with the interior of the cylinder A through the opening $a^2$, and C' C' are the fan-wings (here shown as being attached to the shaft B) prolonged through the fan-case. From the discharge-opening of the fan-case C leads a pipe D, which discharges tangentially into the pneumatic collector E in the usual manner.

F is a pipe or tube through which the material to be disintegrated is fed at $f$, said pipe F communicating with the feed-opening in the head A' of the cylinder A.

$A^3$ is a spout covering an opening $a^3$ in the periphery of the disintegrating-cylinder A, which opening $a^3$ is covered with a heavy wire netting or screen $a^4$. The opening $a^3$ and the spout $A^3$ are shown provided with a gate $A^4$, by which they may be closed to prevent the discharge of material through said opening and spout or opened to permit such discharge.

G is a receptacle communicating through the pipe G' with the lower end of the collector E for the accumulation of the material recovered or taken from the disintegrator through the passage $a^2$ by the air-current produced by the fan and separated from the air by the collector E.

H is a pipe connecting the air-outlet of the pneumatic collector E with the pipe F, and making a complete air-current through the cylinder A and collector E.

The operation of the machine constructed as above described is as follows: Material to be disintegrated, pulverized, or agitated being introduced to the cylinder A through the feed-pipe F and through the opening in the head A' and the beater-shaft B being set in motion at a high rate of speed, the material is hurled by the beaters b against the interior surface of the cylinder A, and thereby cut or broken up. Owing to the rapid revolution of the beaters b, the material in the cylinder A is violently agitated and swept about over the inner peripheral surface of the cylinder, the heavier particles seeking the outer portion of the cylinder and the lighter particles, being less subject to centrifugal force, occupying the central part of the cylinder. The fan C' produces an outward air-current from the central part of the cylinder, occupied by these lighter particles of disintegrated material, and draws them off through the opening $a^2$, sending them forward to the collector E through the pipe D. As fast as material in the cylinder is sufficiently disintegrated or reduced to measurably lose its subjection to centrifugal force, and, therefore, to linger in the central part of the cylinder, or as fast as the particles already small or light enough are released by agitation from the general mass to hesitate in this central part of the cylinder, they are acted upon by this central outward air-current and carried away, while the heavier particles, less subject to said current and more subject to centrifugal force, pass through or remain outside this space till further reduced. The annular head $A^2$ will aid in confining such heavier or insufficiently-reduced portions of the material to the cylinder, and will, moreover, somewhat narrow the field within the cylinder through which the air-current acts. The operation as above described is independent of the peripheral opening $a^3$ in the cylinder A. When said opening is uncovered, the heavier particles, which hug the periphery of the cylinder, will be discharged thereat, while the lighter particles are drawn off by the fan through the central passage $a^2$, as described. In treating some substances the opening $a^3$ may be kept open constantly—as, for example, in disintegrating cotton-seed hulls with the lint thereon for the purpose of recovering the lint for paper-stock. In disintegrating clay or analogous substances, where it is desired to pulverize the entire mass as far as possible, the opening $a^3$ will be closed, except occasionally when it is desired to discharge such hard particles as cannot be reduced and which by their accumulation and movement within the cylinder would interfere with its operation or injure its surfaces.

It will be observed that the opening $a^3$ is in Fig. 3 located near the receiving end of the relatively long cylinder A. It may be otherwise placed, if desired; but for the purpose of operating upon cotton-seed or cotton-seed hulls for the detachment of the lint it has been found to discharge less lint with the bran in this position than when placed elsewhere. The supposed movements within the cylinder A in this case are indicated by the arrows, which are intended to show the direction of the air-currents—that is to say, while there is a continuous outward movement of air about the axis of the cylinder there is a backward movement of the air near the periphery and the heavy particles which hug this periphery pursue the course of the adjacent air-current till it finds outlet at the opening $a^3$.

The connection of the air-outlet and collector E with the induction-pipe F prevents all escape of dust or other fine or light particles produced by the disintegrating apparatus by returning to the cylinder A any such substances or particles as would escape in the absence of the pipe H.

In Fig. 6 the cylinder A is shown as having a plain interior surface, and as being provided with a discharge-opening $a^3$, which is at or near that end of the cylinder at which the air-current is discharged. In said Fig. 6, also, the pneumatic collector E is arranged horizontally instead of vertically, as in the preceding figures, and said collector is provided with a plurality of discharge-openings $e\ e'$ for the material to be separated from the air-current, besides the central opening $e^3$ for the escape of the air, and just beyond the opening $e$ is placed an annular stop $e^2$. The peripheral opening $e$ of the collector-cylinder, being that which is nearest the induction-tube D, is provided with a gate $e^4$, by which it may be opened or wholly or partially closed. The apparatus, as shown in this Fig. 6, is therefore capable of delivering a plurality of products—to wit, one through each of the peripheral openings $e\ e'$ of the collector E.

Obviously the number of openings $e\ e'$ in the horizontal collector E (shown in Fig. 6) may be varied according to the number of separations to be made thereby, and this form of collector may also obviously be employed in place of the collector shown in the preceding figures of the drawings.

We claim as our invention—

1. The combination, with a cylinder having a feed-opening at one end, a peripheral discharge-opening near that end of the cylinder having the feed-opening, and a central discharge-opening at its opposite end, of a rotating shaft carrying beaters within the cylinder and means for producing an outward air-current through the central discharge-opening.

2. The combination, with a cylinder provided with an inlet-opening through one of its heads, a central discharge-opening, and a peripheral discharge-opening, of a gate applied to said peripheral opening, a fan connected with the central discharge-opening, and a rotating shaft provided with beaters within the cylinder.

3. The combination of a cylinder A, provided with a feed-opening through one of its heads, with a central discharge-opening at the opposite end, a rotating shaft provided with beaters arranged within the cylinder, a horizontally-arranged pneumatic collector provided with one or more peripheral openings, a tube connecting the inlet-opening of the collector with the central discharge-opening of the cylinder, and a fan arranged in said tube, substantially as described.

In testimony that we claim the foregoing as our invention we affix our signatures in presence of two witnesses.

JOHN P. BURNHAM.
OLIVER G. BURNHAM.

Witnesses:
M. E. DAYTON,
TAYLOR E. BROWN.